United States Patent [19]
Ben-Dove et al.

[11] Patent Number: 6,094,269
[45] Date of Patent: Jul. 25, 2000

[54] APPARATUS AND METHOD FOR OPTICALLY MEASURING AN OBJECT SURFACE CONTOUR

[75] Inventors: Shimshon Ben-Dove, Tel-Aviv; Michael Fridhendler, K. Yam; Igal Lanzet, K. Bialik; Igor Kuperman, Yokneam, all of Israel

[73] Assignee: Metroptic Technologies, Ltd., Yokneam, Israel

[21] Appl. No.: 09/039,342

[22] Filed: Mar. 13, 1998

Related U.S. Application Data

[63] Continuation-in-part of application No. 09/001,602, Dec. 31, 1997, abandoned.

[51] Int. Cl.$^7$ ................................................ G01B 11/24
[52] U.S. Cl. ...................... 356/376; 356/384; 356/386; 250/559.22; 250/559.24
[58] Field of Search .................................. 356/375, 376, 356/384, 385, 386, 387; 250/559.22

[56] References Cited

U.S. PATENT DOCUMENTS

| | | | |
|---|---|---|---|
| 3,227,886 | 1/1966 | Dunigan et al. | 250/223 |
| 3,513,320 | 5/1970 | Weldon | 250/219 |
| 3,520,607 | 7/1970 | Zoot | 356/5 |
| 3,679,307 | 7/1972 | Zoot et al. | 356/4 |
| 3,723,003 | 3/1973 | Vockenhuber et al. | 356/4 |
| 3,796,492 | 3/1974 | Cullen et al. | 356/4 |
| 3,854,035 | 12/1974 | Tyler et al. | 235/61.11 E |
| 3,888,362 | 6/1975 | Fletcher et al. | 214/1 B |
| 3,895,870 | 7/1975 | Cullen et al. | 356/1 |
| 3,899,250 | 8/1975 | Bamberg et al. | 356/5 |

(List continued on next page.)

FOREIGN PATENT DOCUMENTS

| | | |
|---|---|---|
| 728860 | 3/1966 | Canada . |
| 1 536 022 | 12/1978 | United Kingdom . |
| WO 79/00189 | 4/1979 | WIPO . |
| WO 9108439 | 6/1991 | WIPO . |

OTHER PUBLICATIONS

Tajima, Johji et al. "3–D Data Acquisition by Rainbow Range Finder," from the IEEE 10th International Conference on Pattern Recogition, vol. 1, pp. 309–313 (1990).

Programmable Airfoil Contouring System (PACS) Product Brochure, Diffracto Ltd., Grosse Pte. Woods, MI 48236, 1982.

Company Information, Robomatix Technologies, Ltd./Robomatix Inc., Wixom, MI 48393–3693, 1984.

*Primary Examiner*—Hoa Q. Pham
*Attorney, Agent, or Firm*—Wolf, Greenfield & Sacks, P.C.

[57] ABSTRACT

An optical metrology system and method for rapidly and accurately measuring an object surface contour. The optical metrology system measures cross-sections of an object substantially orthogonal to an axis of the object includes a first and second optical assemblies each arranged proximate to opposing sides of a desired section of the object to be measured. The optical assemblies each include at least one source of electromagnetic radiation such as a laser, each configured to project a linear beam on a proximate object surface. The optical assemblies also include a line scan camera fixed relative to the lasers and having a single column of detector elements substantially parallel with the object surface. The camera receives reflections from the object surface which are provided to a controller for processing. The system also includes a first adjustment device for adjusting a distance between the lasers of each assembly and the object. This causes the linear laser beams to intersect each other at a scanning region. The size and configuration of the scanning region is based upon the configuration of the object surface and is substantially aligned with the column of detector elements in the line scan camera. The system also includes a second adjustment apparatus for adjusting a relative position of the object and the optical assemblies along the axis of the object to scan additional sections of the object. Preferably, the line scan camera is a CCD camera and the detector elements are CCD sensing elements. The controller determines the cross-section dimensions of the object at the desired section of the object,

24 Claims, 9 Drawing Sheets

U.S. PATENT DOCUMENTS

| | | | |
|---|---|---|---|
| 3,947,119 | 3/1976 | Bamberg et al. | 356/5 |
| 3,986,774 | 10/1976 | Lowrey, Jr. et al. | 356/3 |
| 3,994,583 | 11/1976 | Hutchins, IV | 356/28 |
| 4,004,852 | 1/1977 | Pentecost | 356/1 |
| 4,040,738 | 8/1977 | Wagner | 356/1 |
| 4,047,025 | 9/1977 | Lemelson | 250/237 |
| 4,105,925 | 8/1978 | Rossol et al. | 356/375 |
| 4,146,327 | 3/1979 | Harris | 356/1 |
| 4,168,437 | 9/1979 | Nihonmatsu | 250/560 |
| 4,183,672 | 1/1980 | Raber et al. | 356/376 |
| 4,226,536 | 10/1980 | Dreyfus et al. | 356/376 |
| 4,248,532 | 2/1981 | Nosler | 356/1 |
| 4,259,592 | 3/1981 | Früngel et al. | 250/574 |
| 4,281,342 | 7/1981 | Ueda et al. | 358/93 |
| 4,297,725 | 10/1981 | Shimizu et al. | 358/125 |
| 4,325,640 | 4/1982 | Dreyfus et al. | 356/376 |
| 4,373,804 | 2/1983 | Pryor et al. | 356/1 |
| 4,441,817 | 4/1984 | Pryor | 356/375 |
| 4,613,234 | 9/1986 | Cruickshank | 356/394 |
| 4,613,942 | 9/1986 | Chen | 364/513 |
| 4,627,734 | 12/1986 | Rioux | 356/376 |
| 4,652,749 | 3/1987 | Stern | 250/234 |
| 4,674,867 | 6/1987 | Kitai et al. | 355/78 |
| 4,705,401 | 11/1987 | Addleman et al. | 356/376 |
| 4,709,156 | 11/1987 | Murphy et al. | 250/560 |
| 4,743,770 | 5/1988 | Lee | 250/560 |
| 4,750,835 | 6/1988 | McMurtry | 356/375 |
| 4,802,759 | 2/1989 | Matsumoto et al. | 356/376 |
| 4,803,371 | 2/1989 | Durland | 250/560 |
| 4,850,712 | 7/1989 | Abshire | 356/376 |
| 4,858,157 | 8/1989 | Murai et al. | 364/560 |
| 4,872,747 | 10/1989 | Jalkio et al. | 350/421 |
| 4,900,144 | 2/1990 | Kobayashi | 351/206 |
| 4,957,369 | 9/1990 | Antonsson | 356/376 |
| 5,083,867 | 1/1992 | Burk | 356/376 |
| 5,160,977 | 11/1992 | Utsumi | 356/376 |
| 5,162,659 | 11/1992 | Diamond et al. | 250/560 |
| 5,164,579 | 11/1992 | Pryor et al. | 250/206.1 |
| 5,198,877 | 3/1993 | Schulz | 356/375 |
| 5,200,819 | 4/1993 | Nudelman et al. | 358/98 |
| 5,243,402 | 9/1993 | Weber et al. | 356/429 |
| 5,243,406 | 9/1993 | Ando et al. | 356/376 |
| 5,280,179 | 1/1994 | Pryor et al. | 250/561 |
| 5,289,261 | 2/1994 | Yogo et al. | 356/376 |
| 5,293,215 | 3/1994 | Pfendler et al. | 356/360 |
| 5,299,275 | 3/1994 | Jackson et al. | 385/116 |
| 5,309,223 | 5/1994 | Konicek et al. | 356/375 |
| 5,313,260 | 5/1994 | Magyar, Jr. et al. | 356/4 |
| 5,313,542 | 5/1994 | Castonguay | 385/115 |
| 5,319,387 | 6/1994 | Yoshikawa | 345/179 |
| 5,319,442 | 6/1994 | Rosser | 356/375 |
| 5,331,406 | 7/1994 | Fishbaine et al. | 356/375 |
| 5,347,363 | 9/1994 | Yamanaka | 356/376 |
| 5,362,970 | 11/1994 | Pryor et al. | 250/561 |
| 5,371,588 | 12/1994 | Davis et al. | 356/349 |
| 5,381,236 | 1/1995 | Morgan | 356/376 |
| 5,396,331 | 3/1995 | Kitoh et al. | 356/376 |
| 5,402,364 | 3/1995 | Kitoh et al. | 364/560 |
| 5,402,508 | 3/1995 | O'Rourke et al. | 385/31 |
| 5,410,410 | 4/1995 | Yamazaki et al. | 356/376 |
| 5,424,835 | 6/1995 | Cosnard et al. | 356/376 |
| 5,444,536 | 8/1995 | Satzger et al. | 356/376 |
| 5,461,478 | 10/1995 | Sakakibara et al. | 356/375 |
| 5,475,617 | 12/1995 | Castonguay | 364/525 |
| 5,499,194 | 3/1996 | Prestidge et al. | 364/506 |
| 5,500,737 | 3/1996 | Donaldson et al. | 356/376 |
| 5,511,141 | 4/1996 | Peli | 385/116 |
| 5,519,485 | 5/1996 | Ohtani et al. | 356/2 |
| 5,523,582 | 6/1996 | Cheng | 250/559 |
| 5,546,189 | 8/1996 | Syetkoff et al. | 356/376 |
| 5,570,186 | 10/1996 | Satzger et al. | 356/376 |
| 5,589,942 | 12/1996 | Gordon | 356/376 |
| 5,592,563 | 1/1997 | Zahavi | 382/154 |
| 5,594,828 | 1/1997 | Nielsen et al. | 385/121 |
| 5,606,534 | 2/1997 | Stringer et al. | 367/128 |
| 5,608,529 | 3/1997 | Hori | 356/376 |
| 5,609,780 | 3/1997 | Freedenberg et al. | 219/121 |
| 5,615,294 | 3/1997 | Castonguay | 385/115 |
| 5,625,446 | 4/1997 | Bedard | 356/3.08 |
| 5,627,647 | 5/1997 | Baan et al. | 356/372 |
| 5,636,023 | 6/1997 | Yanagisawa | 356/371 |
| 5,636,026 | 6/1997 | Mian et al. | 356/376 |
| 5,638,461 | 6/1997 | Fridge | 382/141 |
| 5,640,246 | 6/1997 | Castonguay | 356/445 |
| 5,644,141 | 7/1997 | Hooker et al. | 250/559 |
| 5,646,733 | 7/1997 | Bieman | 356/376 |
| 5,654,800 | 8/1997 | Svetkoff et al. | 356/376 |
| 5,668,631 | 9/1997 | Norita et al. | 356/376 |
| 5,675,407 | 10/1997 | Geng | 356/147 |

APPARATUS AND METHOD FOR OPTICALLY MEASURING AN OBJECT SURFACE CONTOUR

RELATED APPLICATION

This application is a continuation-in-part of application Ser. No. 09/001,602, filed Dec. 31, 1997, now abandoned.

BACKGROUND OF THE INVENTION

1. Field of the Invention

The present invention relates generally to optical metrology and, more particularly, to an apparatus and method for rapidly and accurately measuring a surface contour of an object.

2. Related Art

The need to accurately measure object surface contours for dimensional verification adds significantly to unit manufacturing time, as well as subsequent maintenance and repair cost and activities. Typically, the associated processes require the involvement of skilled personnel, particularly where the article has a complex surface configuration. Such objects include, for example, dies, pistons and other objects for which one surface of the object is to be measured, as well as turbine, compressor and power turbine engine blades that require measurement of both sides of the object.

Conventional inspection methods include the use of a plastic template that fits over the blade for comparison of the blade to dimensions indicated on the template. In addition, mechanical calipers have traditionally been used to measure various dimensions on the blade. Such contact or mechanical gauging techniques, however, are susceptible to wear of the gauging device, resulting in a loss of accuracy over time. Moreover, such techniques require operator skill and are time intensive. They are also dependent upon visual inspection, and are generally incapable of providing a direct input to a recording system.

A significant problem with the use of contact or mechanical inspection techniques is the rate of false rejections of serviceable objects such as blades. Oftentimes, blades initially rejected by the use of visual, contact or mechanical gauging procedures have been found to be falsely rejected. Individual blades are costly depending upon the engine size and the function for which the blade is manufactured. With many blades at each stage of an engine, the cost of a high blade reject rate is prohibitive.

To overcome such drawbacks, other conventional approaches for determining the surface contours of objects have been developed. One conventional approach includes the formation of an image of the object, typically acquired by a video camera. The image is digitized and stored in a computer memory as a set of pixels. The computer then analyzes the image, such as by comparing it, pixel by pixel, with a stored reference image. However, there are drawbacks to many such conventional techniques. For example, the processing of a stored image requires a very large number of calculations. Even with high-speed digital computers, processing a stored image requires considerable time, thereby limiting the ability of the system to generate immediate, real-time results. Also, the images are often of poor quality due to the inability to accurately obtain high resolution images of the object.

Coordinate measuring machines (CMMs) have also been used to obtain dimensional information of an object. Typically, a probe is positioned within a three coordinate measurement space to contact an object surface at which time the special position of the probe tip is measured. CMMs, however, must obtain many measurement points to determine a surface contour. For example, to measure the contour of a blade section, a CMM must obtain 20 to 30 measurement points on each side of the blade. As a result, CMMs are impractical to use to measure blades or other objects in a high-volume manufacturing environment. Furthermore, considerable set-up time is required to program CMMs, reducing their availability. More importantly, the accuracy of a CMM degrades when measuring surface contours having a small radius, such as the leading and trailing edges of a blade. Improving the accuracy by increasing the number of measurement points taken at such locations does not significantly compensate for the loss of accuracy and further increases the number of requisite measurement points which must be taken. This further increases the time necessary to obtain an accurate measurement of the dimension of the object. Another drawback to the use of CMMs includes inaccuracies due to the size of the probe tip relative to the smoothness of the measured surface. This further reduces the accuracy with which a given probe tip provides measurement information to the implementing CMM.

More recently, non-contact measurement techniques have been developed to measure surface contours. Typically, single point range sensors using optical triangulation techniques are used to perform non-contact measurements of the dimensions of an object. An illumination source projects a defined area of light onto the surface to be measured. Reflections received from the surface are used to form an image of the light reflected onto a light-sensing detector. As the distance from the sensor to the object surface changes, the position of the reflected image on the detector plane shifts. The lateral shift of position of the image on the detector is used to measure the distance between the sensor and the surface. Such techniques are described in U.S. Pat. No. 4,872,747 to Jalkio et aL. and U.S. Pat. No. 5,362,970 to Pryor et al.

A drawback to such conventional optical triangulation techniques using a single point light source is that in order to obtain high accuracy, the detector must be able to resolve small lateral shifts in the spot position. This generally requires high magnification in the direction of travel of the reflected image. However, the sensor is typically separated from the object being measured by a large stand-off distance. As a result, the sensor has a limited range of motion and must be adjusted in position relative to the blade to retain the object within the measurement range. Furthermore, such conventional systems are typically slow, subjecting them to the above-noted drawbacks.

What is needed, therefore, is a method and apparatus that provides fast and accurate dimensional measurements which can be performed without the need of particularly skilled personnel and without directly contacting the manufactured object.

SUMMARY OF THE INVENTION

The present invention is an improved apparatus and method for rapidly and accurately measuring surface contours of an object. In one aspect of the invention, an optical metrology system for measuring a contour of an object surface is disclosed. The system includes an optical assembly arranged proximate to the object surface. The optical assembly includes first and second radiation sources each configured to project a substantially linear beam of imagable electromagnetic radiation on a predetermined portion of the proximate object surface. The first and second linear beams of electromagnetic radiation intersect each other at a scanning region projected on the predetermined portion of the object surface that has been selected to be measured. The optical assembly also includes a line camera fixed relative to the radiation sources and having a linear arrangement of detector elements substantially parallel with the object surface to be measured, and configured to receive imagable electromagnetic radiation reflected from the portion of the object illuminated by the scanning region. The system also includes an adjustment apparatus constructed and arranged to adjust a relative position of the object and the optical assembly along a path that is substantially parallel with an axis of the object orthogonal to the predetermined portion of the object surface to cause the first and second radiation sources to illuminate another predetermined portion of the proximate object surface. Preferably, the first and second radiation sources are lasers, and the electromagnetic radiation has a wavelength in the visible spectrum. The line camera may be any type of line camera, such as a CCD, CID or CMOS camera.

In one embodiment, the system also includes an object control and support apparatus constructed and arranged to secure and reposition the object to predetermined locations along a second axis substantially orthogonal to the first axis of the object. In another embodiment, the system also includes a processor, operably coupled to the optical assemblies, for determining the contour of the predetermined portion of the proximate object surface using the reflected electromagnetic radiation received by the camera. In one embodiment, an object control and support apparatus is included. This apparatus is constructed and arranged to reposition the object to predetermined locations along a second axis substantially orthogonal to the first axis of the object.

In another aspect of the inventions an optical metrology system for measuring object surface contours is disclosed. This system includes a plurality of optical assemblies arranged proximate to opposing surfaces of the object surface. Each of the optical assemblies includes at least one radiation source and a camera. The radiation source(s) is/are configured to project a substantially linear beam of imagable electromagnetic radiation on a portion of one or opposing surfaces of the object. The camera is fixed relative to the radiation source(s) and has a single column of detector elements substantially parallel with and proximate to the illuminated object surface. The camera is configured to receive the electromagnetic radiation reflected from the proximate object surface which is substantially parallel with the column of detector elements. The optical metrology system also includes a first adjustment apparatus constructed and arranged to adjust a distance between the radiation source(s) and the proximate object surface. The adjustment apparatus adjusts either the radiation source(s) or the object surface along a second axis that is substantially orthogonal to the first axis of the object. This system also includes a second adjustment apparatus constructed and arranged to adjust a relative position of the object and the optical assemblies in a direction which is substantially parallel with the first axis of the object.

In one embodiment, the camera is a CCD camera and the detector element is a CCD sensing element. This system also preferably includes a processor that is operably coupled to the plurality of optical assemblies. The processor is configured to determine the contours of each of the proximate object surfaces using the reflected electromagnetic radiation received from the camera.

In one embodiment, the plurality of optical assemblies include four assemblies. A first and a second optical assembly are arranged proximate to one of the opposing object surfaces such that first and second linear beams generated by the first optical assembly are substantially contiguous with the first and second linear beams, respectively, generated by the second optical assembly. This illuminates the portion of the object surface that is substantially aligned with the column of detector elements. The contiguous linear beams preferably extend some distance beyond the upper and lower edges of the object. Similarly, a third and a fourth optical assembly are arranged in the same manner proximate to the same opposing surface of the object such that the first and second linear beams generated by the third optical assembly are substantially contiguous with the first and second linear beams, respectively, generated by the fourth optical assembly to illuminate a portion of the surface that is substantially aligned with the column of detector elements. The contiguous linear beams also preferably extend some distance beyond upper and lower edges of the object.

In a further aspect of the invention, an optical metrology system for measuring cross-sections of an object substantially orthogonal to an axis of the object is disclosed. The system includes an optical assembly arranged proximate to a side of a predetermined section of the object. The optical assembly includes a first and a second light source and a line scan camera. The light sources are each configured to project a substantially linear light beam on the proximate object surface. The line scan camera has a column of detector elements substantially parallel with the predetermined section configured to receive reflected light from the object surface.

The system also includes a first object adjustment device constructed and arranged to adjust a distance between the light sources and the object to cause the light beams to intersect each other at a scanning region substantially aligned with the column of detector elements. A second object adjustment device is also included in certain embodiments for rotating the object to place an opposing side of the object at the predetermined section in alignment with the column of detector elements. In one embodiment, the system also includes a third object adjustment device constructed and arranged to adjust a relative position of the object and the optical assemblies along the axis of the object.

In another aspect of the invention, an apparatus for non-contact inspection of an object is disclosed. The apparatus includes first and second optical assemblies arranged in substantial alignment with each other and on opposing sides of the object. Each optical assembly includes one or more projectors for generating a linear projection of electromagnetic radiation on a predetermined portion of the object surface. An adjustment means for adjusting the object in a direction substantially orthogonal to the longitudinal axis of the object such that a distance between the first and second optical assemblies and the object changes is also included in certain embodiments of this aspect of the invention.

In one embodiment, a drive means for adjusting a relative position of the object and the optical assemblies along the longitudinal axis is included. The drive means is operated to position a desired section of the object in the interrogation volume so that the projectors of each optical assembly project the beam of electromagnetic radiation on an opposing surface of the desired section of the object.

In a still further aspect of the invention, a method for high speed scanning measuring of an object to develop physical information associated with the object, is disclosed. The method includes the steps of: providing an optical assembly arranged proximate to the object surface. The optical assembly includes at least one radiation source configured to project a substantially linear beam of imagable electromagnetic radiation on a predetermined portion of the proximate object surface, and a camera fixed relative to the radiation source(s) and having a single column of detector elements substantially parallel with the surface and substantially aligned with the substantially linear beam. The camera is configured to receive the imagable electromagnetic radiation reflected from the object surface. The method also includes the step of projecting an imagable electromagnetic radiation with at least one projector on opposing surfaces of the object and moving the object relative to the projector(s) to scan the radiation across a surface of the object, wherein the scanning path is orthogonal to a longitudinal axis of the object, generating an imagable electromagnetic radiation signal. In one embodiment, the method also includes the steps of receiving the reflected imagable electromagnetic radiation signal from the surface of the object with the camera and measuring an amount of radiant energy in the received electromagnetic radiation signal.

In one embodiment, the physical information is dimensional information and the imagable electromagnetic radiation is light. In another, each detector element is a column of CCD sensing elements extending substantially parallel to the detector axis and wherein the step of moving is performed in a direction substantially perpendicular to the columns of the CCD sensing elements.

An advantage of aspects of the present invention is that the system quickly measures the cross-section of any desired object with high accuracy, resolution and good repeatability. The use of multiple radiation sources to illuminate a surface of the object eliminates adverse effects of surface reflections and shadows. Also, the narrow field of view of the line camera eliminates adverse parasitic effects while a large number of detector elements in the line array increase accuracy and reliability. The speed of measurement is enhanced by the simultaneous measurement of both sides of an object in certain embodiments of the present invention. Also, the speed at which the system reads a single line array of detector elements enables the present invention to quickly and efficiently measure many sections of an object.

Another advantage of aspects of the present invention is that additional optical assemblies may be utilized to simultaneously measure other surface contours and cross-sections of the object. This enables the present invention to also measure the object with high accuracy and speed. In particular, multiple optical assemblies are aligned along an axis substantially orthogonal to the first axis of the object in one embodiment of the invention. This enables the present invention to measure the contour of the entire object's surface orthogonal to the first axis of the object and parallel to the detector elements. This eliminates the need to interpolate image data to obtain a complete cross-section of the object.

A still further advantage of aspects of the present invention is that the system provides application software with sufficient data to determine dimensions of a cross-section of the object. Furthermore, the cross-sectional views are obtained for ease of comparison with specifications set forth in manufacturing drawing and other industry specifications.

A still further advantage of aspects of the present invention is that the use of multiple lasers or other electromagnetic radiation sources on each side of the object provides additional opportunities to illuminate a desired scan line of the surface. This prevents inaccurate or incomplete measurements resulting from surfaces which obstruct the line of sight between the light source and the desired object surface.

A still further advantage of aspects of the present invention is that there is only one moving axis during measurement, thereby increasing the speed and efficiency of the system. In addition, in certain embodiments only the object is moved along this axis. This further increases the speed and efficiency of the system of the present invention.

An additional benefit of aspects of the present invention is that the focus of the cameras and radiation sources is continuously maintained throughout the measurement process, either by fixing them relative to each other, or by providing an automatic focus capability on the line scan camera which is responsive to and dependent upon the relative position of the radiation sources and the object being measured.

Further features and advantages of the present invention as well as the structure and operation of various embodiments of the present invention are described in detail below with reference to the accompanying drawings.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements. In the drawings, like reference numerals indicate like or functionally similar elements. Additionally, the left-most one or two digits of a reference numeral identifies the drawing in which the reference numeral first appears.

DETAILED DESCRIPTION

Figure 1:
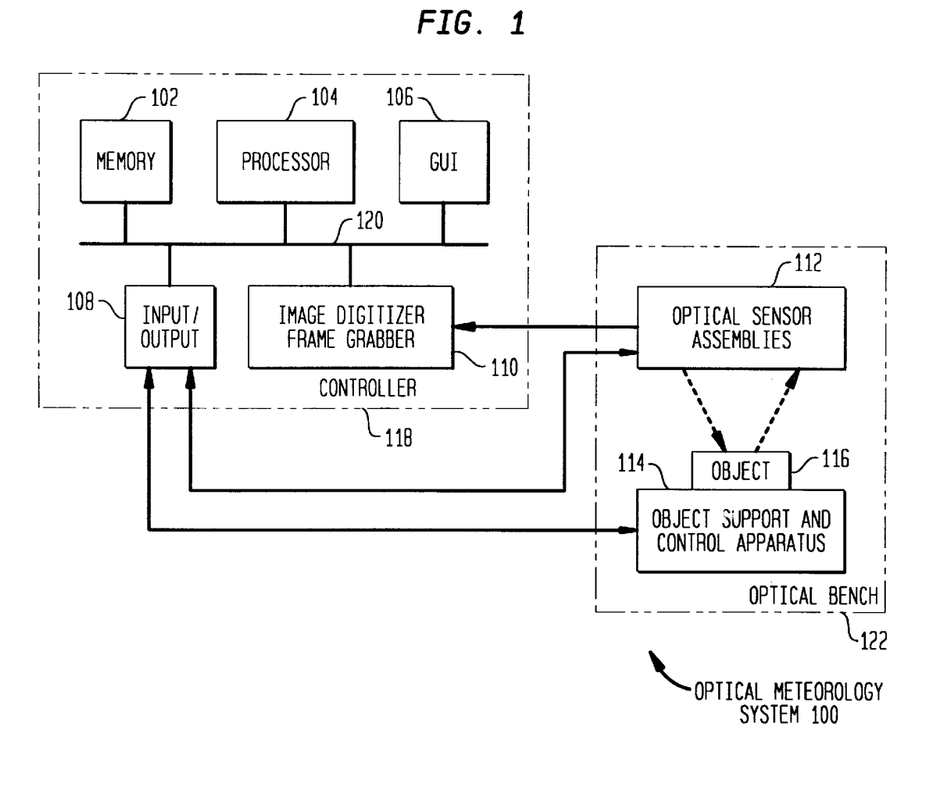
FIG. 1 is a functional block diagram of one embodiment of the optical metrology system of the present invention.

FIG. 1 is a functional block diagram of one embodiment of the optical metrology system of the present invention. The optical metrology system 100 broadly includes one or more optical sensor assemblies 112 configured in accordance with the present invention to provide high speed scanning measurements of an object 116 secured to an object support and control apparatus 114. A controller 118 coupled to the optical assemblies 112 and apparatus 114 controls the operation of the system 100 and generates dimensional information such as height information of a surface of the object 116 based upon scanning data obtained by the optical assemblies 112.

Each of the optical assemblies 112 of the present invention includes one or more sources of electromagnetic radiation, oriented so as to direct the radiation towards a predetermined section of the object 116. A line camera arranged to receive radiation reflected from the surface of the object 116 is also included in each optical assembly 112. In accordance with one embodiment of the present invention and as will be described in detail below, the optical assemblies 112 are preferably arranged on opposing sides of the object 116 such that opposing line cameras are positioned to image opposing surfaces of a predetermined section of the object 116. This information is then provided to the controller 118 for calculating cross-sectional dimensions of the object. However, not all objects require the surfaces of both sides to be measured. For example, certain objects, such as dies, require the dimensions of only one surface to be verified. Accordingly, in alternative embodiments, a single optical assembly is used to measure the surface contour on one side of an object.

The optical assemblies 112 and object support and control apparatus 114 operate in conjunction with each other to perform linear array scanning of predetermined sections of the object 116 in accordance with the present invention. As will be explained with reference to the exemplary embodiments described below, the relative position of the object 116 and optical sensor assemblies 112 is adjusted to measure one or more desired surfaces or sections of the object 116.

The controller 118 generally includes an image digitizer/frame grabber 110 electrically coupled to the optical sensor assemblies 112. The image digitizer/frame grabber 110 samples and digitizes the input images from the line cameras contained within the optical sensor assemblies 112, as described in detail herein below. The frame grabber 110 places each acquired image into a frame buffer having picture elements. Each of the picture elements may consist of an 8-bit number representing the brightness of that spot in the image. The image digitizer/frame grabber 110 may be any conventional frame grabber electronics now or later developed. Alternatively, the image digitizer/frame grabber 110 may comprise a vision processor as is well known in the art.

The control and operations of the optical metrology system 100 may be programmed at memory 102 to include programs for image processing and/or image analysis which are run on a processor 104, as is well known in the art. Any known application software may be used to combine this information to produce the final coordinate information of the object cross section. A graphical user interface 106 is also preferably provided to display images on a monitor.

The controller 118 is typically a computer-based system and includes a system bus 120 which receives information from the image digitizer/frame grabber 110 and passes the information to the processor 104 which may be any well known processor now or later developed that is compatible with the optical assemblies 112 and object support and control apparatus 114. The system bus 120 may be, for example, a PCI, an EISA, ISA or VL system bus or any other standard or non-standard computer bus.

The optical sensor assemblies 112 and object support and control apparatus 114 are generally constructed on an optical bench 122 of any well-known configuration. If required, the optical bench 122 is passively suspended on an anti-vibration base to minimize adverse environmental effects. Exemplary arrangements of the camera and lasers of the present invention are described below. In the following discussion, the optical metrology system 100 is constructed and operated in accordance with the present invention to inspect at least one surface of an object 116. In the following discussion, the object 116 is a jet engine blade. However, it should be understood that the apparatus 100 could be used to inspect surfaces on any other two- and three- dimensional articles. As used herein the term "surface" includes any object surface, including surfaces that are flat, have a smooth curvature or have a very irregular configuration.

Figure 2:
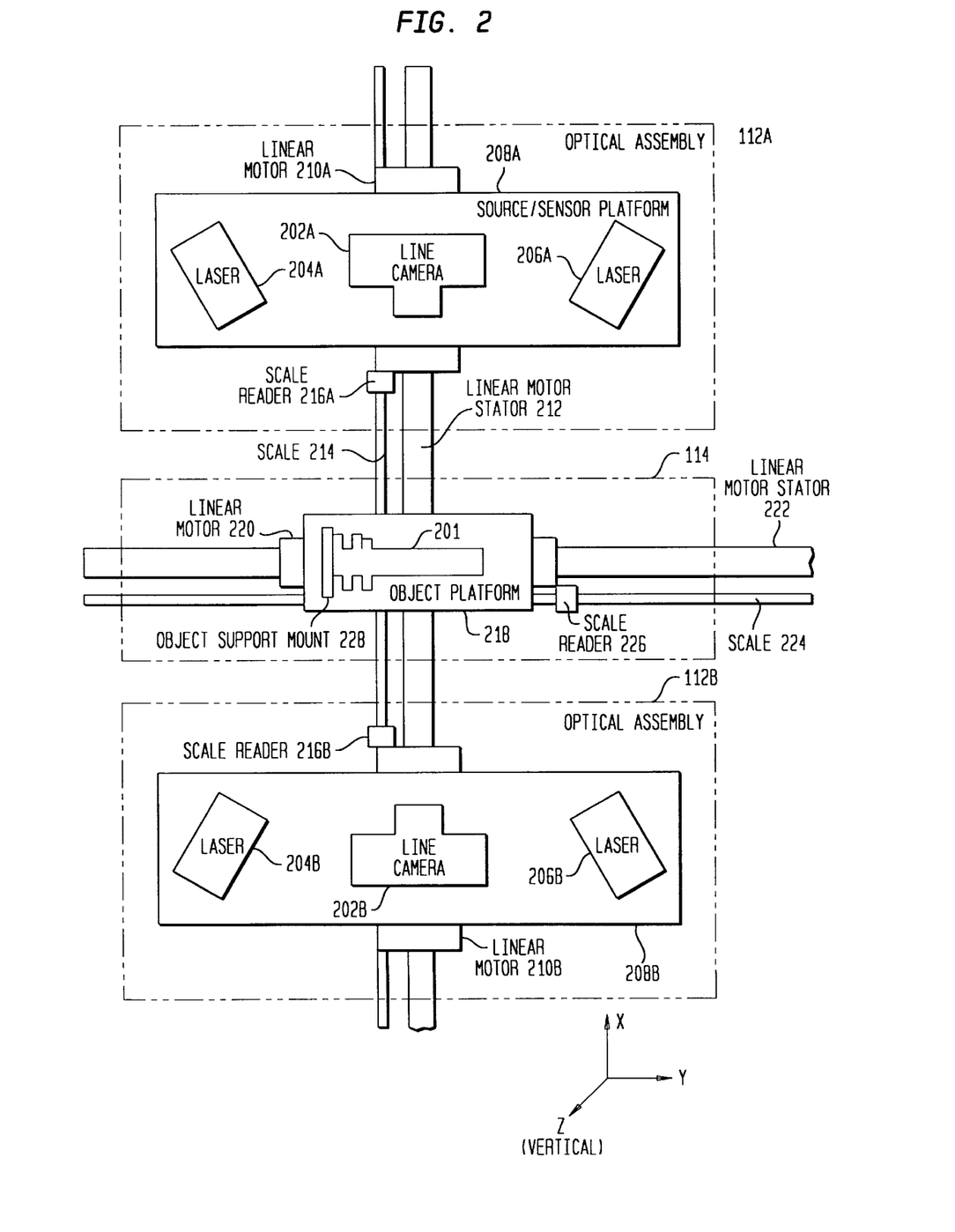
FIG. 2 is a structural block diagram showing the top view of one embodiment of two optical sensor assemblies arranged on opposing sides of an object.

FIG. 2 is a structural block diagram showing a top view of one embodiment of the optical metrology system 100. Here, the object to be measured is an engine blade 201, such as a turbine of compressor blade. In this illustrative embodiment, two optical assemblies are implemented. Specifically, optical assemblies 112A and 112B (collectively and generally referred to as optical assemblies 112) are arranged on opposing sides of the blade 201. Each optical assembly 112 includes a line camera and at least one source of electromagnetic radiation which, in this embodiment, is a laser of known construction. As shown, optical assembly 112A includes a line camera 202A and two lasers 204A and 206A. Similarly, optical assembly 112B includes line camera 202B and lasers 204B and 206B.

In this embodiment, the line camera 202 and associated lasers 204 and 206 of each optical assembly 112 are fixed relative to each other. In the illustrative embodiment, this is achieved by securing the line camera 202 and lasers 204 and 206 to a source/sensor platform 208. Accordingly, optical assembly 112A includes a source/sensor platform 208A while optical assembly 112B includes a source/sensor platform 208B. As one skilled in the relevant art would find apparent, however, the line camera 202 and lasers 204 and 206 may be fixed relative to each other in any known manner. It should also be apparent that the fixed relative position of the lasers 204, 206 and camera 202 enables the camera to remain focused as the scanning operations are performed.

As will be explained in detail below, the platform 208 may be positioned along the X-axis. In the illustrative embodiment, the platform 208 is secured to a linear motor 210 that travels along a slideway or linear motor stator 212. A scale 214 is provided which is read by scale readers 216A and 216B to accurately determine the position of each optical sensor assembly 112 relative to the blade 201. It should be understood that any other well known means may be used to cause the platform 208 to travel along the X axis. For example, a precision worm gear drive that is actuated by a sprocket drive belt and driven by a rotation motor may be used. Furthermore, other means for determining the location of the platform 208 and, hence, the line camera 202 and lasers 204, 206 may be used. For example, rather than the scale 214 and readers 216, magnetic sensors or optical encoders may be used to measure the position of the optical sensor assembly 112, along the X-axis.

The lasers 204 and 206 each generate a linear laser beam (not shown). The laser beams are substantially parallel with each other and, preferably, oriented so as to be substantially parallel with the vertical Z-axis. As the distance between the optical assemblies 112 and the blade 201 is increased or decreased, the surface areas illuminated by the laser beams cross each other at what is referred to herein as a scanning region. The lasers 202 and 204 and blade 201 are arranged so that the scanning region is located on the desired section surface which is being measured. This is described in greater detail below.

In one preferred embodiment, the optical assemblies 112 are repositioned continuously; that is, they are moved at a constant velocity along the X-axis. Alternatively, the optical assemblies 112 may be moved periodically during a single scan. As used herein, to scan a desired portion of an object surface requires the scanning region to illuminate the entire desired object surface. This may occur instantaneously or over a predetermined period of time. When the object surface is substantially parallel with the Z-axis, then the scanning region is approximately equivalent to the area of the object surface illuminated by a single laser beam. However, if the object surface is not parallel with the Z-axis, then the regions illuminated by each of the laser beams will not be parallel and the scanning region (the intersection of the two laser beams) will encompass only a portion of the object surface. The scanning region then traverses the desired section of the object to completely scan the surface. Depending on the application, it may be preferred that the blade 201 be repositioned rather than the two optical assemblies 112. In such an embodiment, the object platform 218 travels from a position closest to one optical assembly such as assembly 112A to a position closest to the other optical sensor assembly 112B. For reasons discussed below, this causes the scanning region to travel from the top to bottom of one side of the blade 201, while the scanning region on the opposite side of the blade 201 scans the opposing object surface from the bottom to the top of the blade 201.

The object support and control apparatus 114 broadly includes an object platform 218 and support mount 228 for securing the blade 201 in a desired position and orientation. A linear motor 220 is slidably mounted on a slideway or stator 222 and is controlled by controller 118. A scale 224 is read by a scale reader 226 which provides accurate positional information to the controller 118. The motorized apparatus 114 preferably includes servo control electronics for positioning the blade 116 along the Y-axis.

A cross-section of the blade 201 is selected to be measured by moving the blade 201 axially along the Y-axis to place the desired section in a common viewing plane of the line cameras 202. To obtain a next cross section of the blade 201, the relative position of the blade 201 and optical assemblies 112 along the Y-axis is adjusted to establish a new relative position. At each desired position, an X–Z scan is performed as described below. The corresponding X-axis information is obtained from each line array 301 (described below) scanned electronically at a predetermined rate of, for example, 2000 line scans per second. The information on one side of the blade 201 is obtained from lasers 204A and 206A and line camera 202A, and the information on the opposite side of the blade 201 is obtained from lasers 204B and 206B and line camera 202B. The two resulting images are obtained by the frame grabber electronics 110 discussed above resulting in the generation of X,Y,Z coordinate data for each point on opposing sides of the blade 201 at the desired section.

As noted, the blade 201 is illuminated with the lasers 204 and 206 which generate or project electromagnetic radiation. Preferably, the laser light is in the visible light portion of the electromagnetic spectrum, having an approximate wavelength of 650 nm. Other portions of the electromagnetic spectrum may also be used based upon the application. The radiation is reflected by the surface of the blade 201 and is received by an associated camera 202 in the same optical assembly 112.

Preferably, two lasers 204 and 206 are used to illuminate the same surface of the blade 201. Thus, in the exemplary configuration shown in FIG. 2, there are two lasers 204 and 206 included in each optical assembly 112. The two lasers 204 and 206 on each side of the blade 201 are positioned substantially orthogonal to each other as shown in FIG. 2, although other angles may be more appropriate in a given application. It should be understood that one laser may be used in alternative embodiments. However, there are a number of benefits associated with using more than one laser scanner, as described below with reference to FIGS. 4A–4H.

In the illustrative embodiment, the two opposing line cameras 202 are shown positioned between an associated pair of lasers 204 and 206 on their respective side of the blade 201. It should be understood that any other arrangement may be implemented such that the line camera 202 receives the electromagnetic radiation reflected from the proximate surface of the blade 201. Also, as shown in FIG. 2, the two line cameras 202 are substantially aligned with each other and are arranged with their respective line of sight substantially orthogonal to the blade Y-axis. The line array of each camera 202 is parallel to a vertical section plane that includes the common X-axis on which the cameras 202 are aligned. As a results, the two opposing cameras 202 image opposing surfaces of one cross-sectional segment of the blade 201.

Figure 3A:
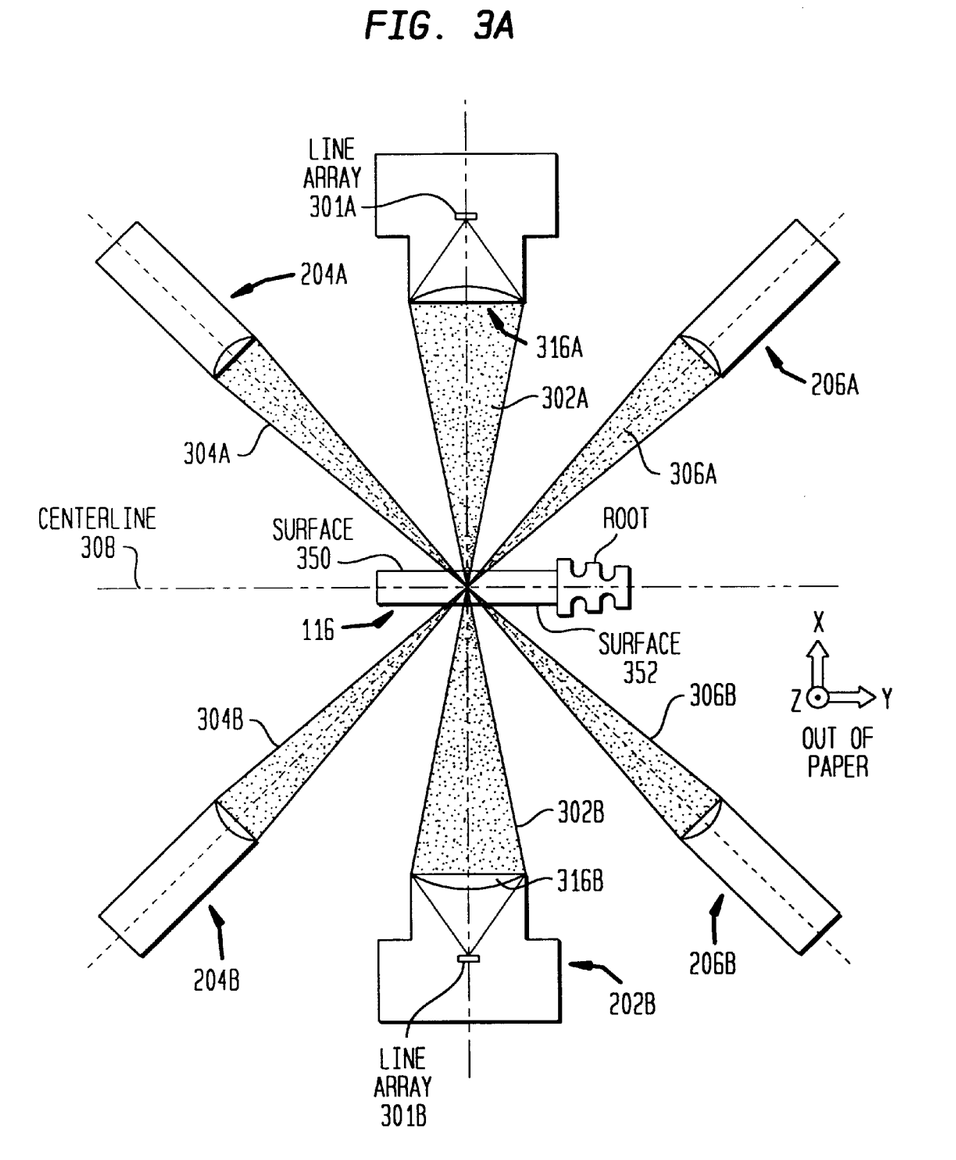
FIG. 3A is a simplified perspective view of the embodiment shown in FIG. 2.
Figure 3B:
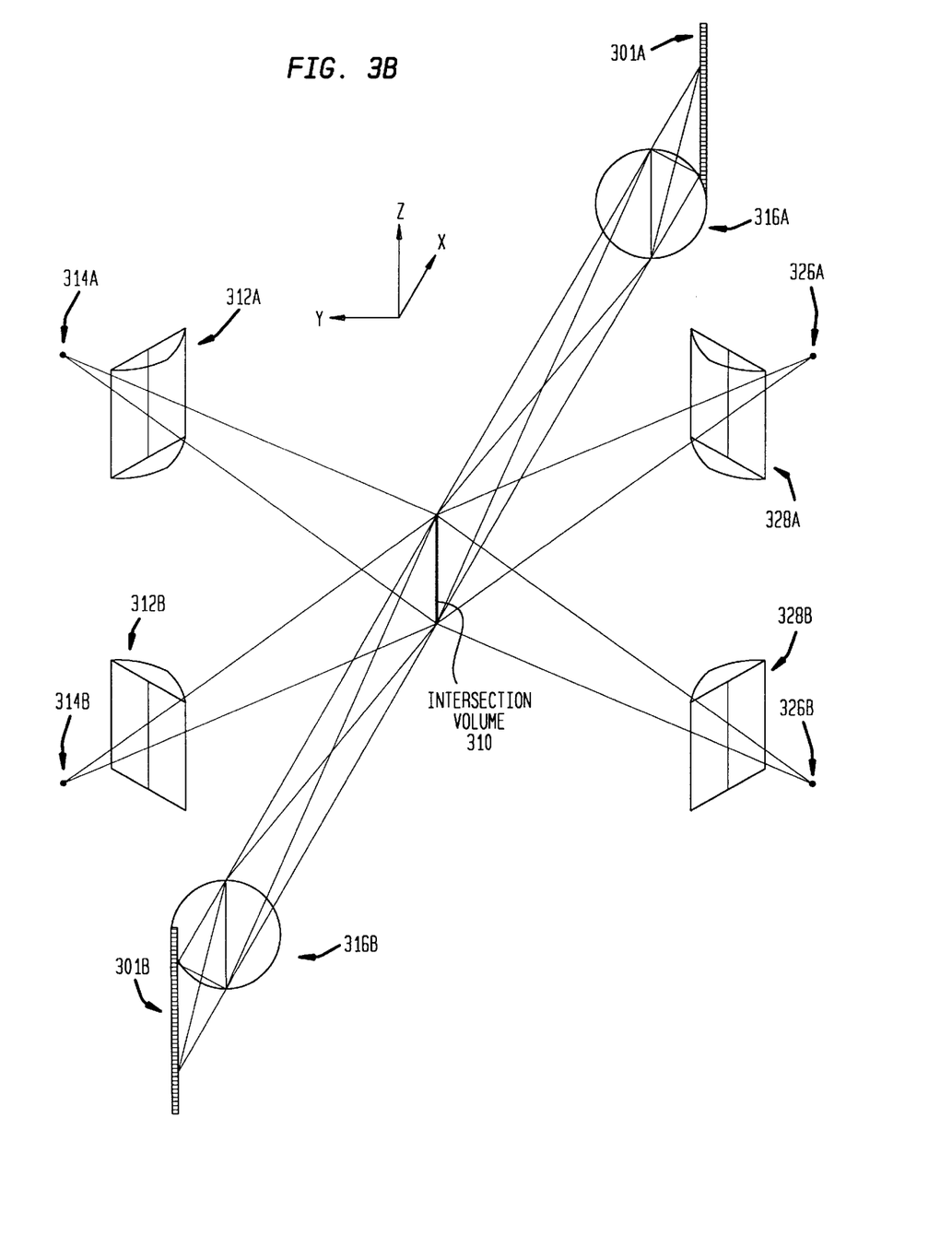
FIG. 3B is an illustration of the optical configuration of the arrangement illustrated in FIG. 3A.

FIG. 3A is a top view of the embodiment illustrated in FIG. 2, showing the relationship between the primary components of the optical assemblies 112 and the blade 201. FIG. 3B illustrates the optical configuration of the same embodiment. Each laser 204, 206 has a source 314, 326 and a lens 312, 328 which preferably produce a substantially linear beam of light in the Z-axis. Preferably, the light beam is substantially parallel with the vertical plane (that is, a plane that includes the Z-axis). The light sources 314, 326 generate light which passes through their respective lens 312, 328, respectively, and are arranged such that the light beams 304, 306 intersect at the center line 308 (Y-axis) and plane defined by the line arrays 201 (X-axis). The light beams 304 and 306 define a small interrogation volume 310. In one preferred embodiment, the interrogation volume 310 approximates the shape of a cylinder with dimensions of approximately 100 mm in length and 0.1 mm diameter. As shown in FIG. 3A, the interrogation volume 310 is approximately in the center of the blade 201 at the desired cross-section. The interrogation volume 310 may be adjusted to suit a specific application measuring capacity.

The desired section of the blade 301 to be measured is positioned within the interrogation volume 310 for measurement. The lasers 204 and 206 emit laser beams 304 and 306, respectively, to illuminate the proximate surface of the blade 201 at the desired section. The scattered light 302 reflected from the object surface is received by the line array 301 in the line camera 202. As noted, each camera 202 includes a line array sensor 301 preferably having a single column of photoelectric elements parallel with the Z-axis. Each camera lens 316 focuses the interrogation volume 310 onto its line array sensor 301 as shown in FIG. 3B. The sensors are preferably spaced apart at a sufficient distance such that when the blade 201 is placed approximately equidistant between the assemblies 112, the blade 201 it is at a sufficient distance from the sensors 301 such that the laser light exceeds the outer physical limits of the blade profile along the Z-axis. This insures the complete imaging of the desired cross-section in a single scan.

As noted, the blade 201 is moved along the Y-axis which is perpendicular to both the optical axis of the camera lens 316 and the linear array of pixels 301 in the camera 202. Thus, as the contents of the linear array 301 are repeatedly read out line by line, the image of the blade 201 moving relative to the camera 202 is created row by row. This information, as noted, is stored and processed in a well known manner.

In one preferred embodiment, the line camera 202 is a charge-coupled device (CCD) camera having a single column of photoelectric elements 301. In this embodiment, the camera preferably includes a solid state image sensor having a single row of at least 5000 CCD sensing elements. It should be understood that other photoelectric linear arrays may be used. Alternatively, the line camera 202 may be a CID or CMOS camera having an analogous linear array 301 of photoelectric elements.

FIGS. 4A–4H show a surface 350 of the blade 201 illuminated by two laser beams 304 and 306. The surface 350 that is being measured by an optical assembly 112 may be positioned at any angle relative to the line array 301 in the camera 202 of the optical assembly 112. For example, the blade 201 may be rotated about the Y axis to present the leading or trailing edge of the blade 201 toward the optical assembly 112. The orientation of the laser beams 304 and 306 illuminating the surface 350 is determined by the configuration of the surface 350 which is to be measured relative to the linear laser beams generated by the lasers 204 and 206. As noted, these laser beams 304 and 306 are substantially parallel with the line array 301. FIGS. 4A–4D show four sequential views of the surface 350 illuminated by the two laser beams 304 and 306 when the surface 350 is substantially parallel with the line array 301. FIGS. 4E–4H show four sequential views of the surface 350 which has been rotated about the Y axis so that the upper edge of the blade 201 is closer than the lower edge of the blade 201 to the optical assembly 112 that is generating the laser beams 304 and 306 shown in the figures.

To perform a single scan of each surface 350 and 352 of the blade 201, the distance between the blade 201 and the two lasers 204 and 206 is adjusted. That is, either the lasers 204 and 206 or the blade 201 is moved relative to each other along the X-axis. In the embodiment illustrated in FIG. 2, the object platform 218 and/or the source/sensor platform 208 travels along the linear motor stator 212. Preferably, to increase or decrease the distance between the assemblies 112 and the blade 201, the object platform 218 travels along the linear motor stator 212 under the command of the controller 118, as noted above. This enables the surface contour of opposing sides of the blade 201 to be scanned simultaneously through the movement of one platform.

Figure 4A:
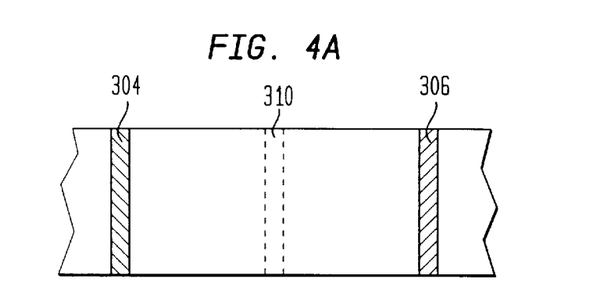
FIG. 4A–4D are a series of perspective views of the laser beams generated by the lasers shown in FIG. 2 traveling over a substantially parallel object surface.
Figure 4B:
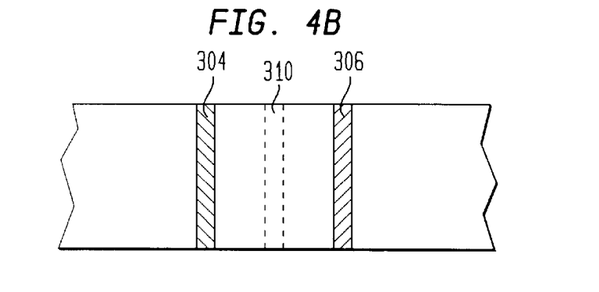
Figure 4C:
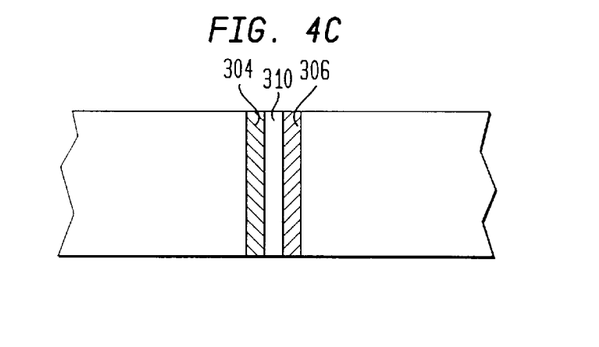
Figure 4D:
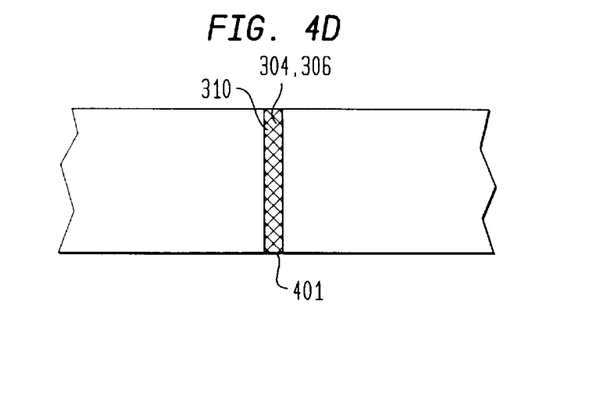
Figure 4E:
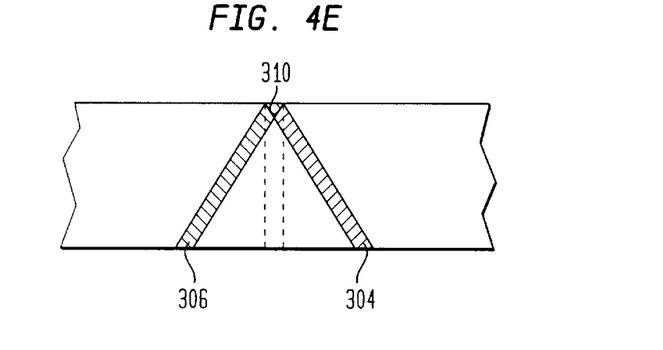
FIG. 4E–4H area series of perspective views of the laser beams generate by the lasers shown in FIG. 2 traveling over an object surface that is oriented with a top portion positioned closer to the line scan camera than the lower portion.
Figure 4F:
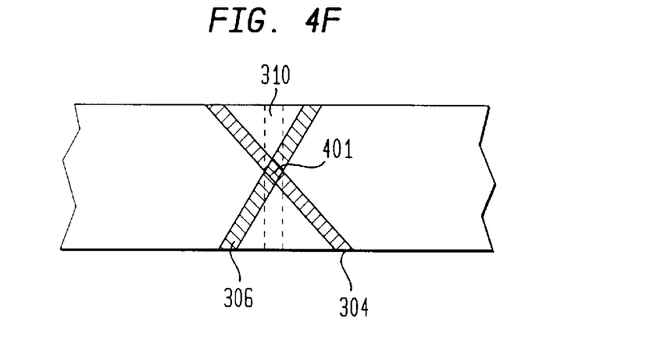
Figure 4G:
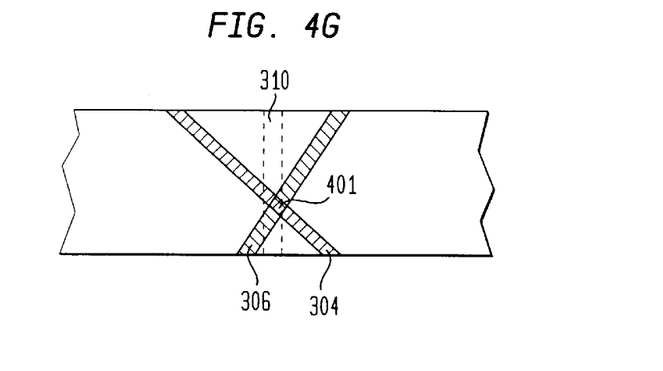
Figure 4H:
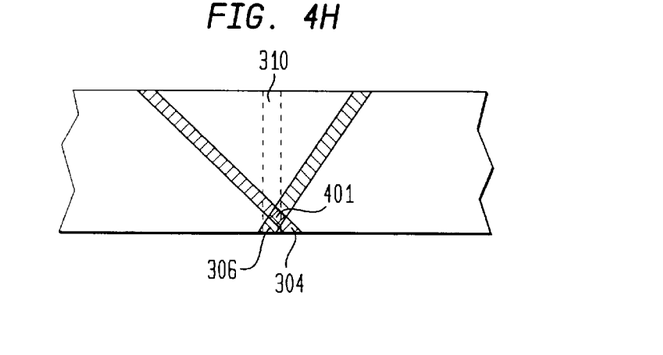

As the relative distance between the lasers 202 and 204 and the blade 201 changes, the laser beams 304 and 306 travel across the surface 250 toward each other. The laser beams 304 and 306 intersect to form a scanning region 401 at interrogation volume 310. As shown in FIGS. 4A–4C, when the surface 350 is substantially parallel to the line array 301, the laser beams 304 and 306 travel toward each other and toward the interrogation volume 310 which is substantially aligned with the line array 301. As shown in FIG. 4D, the two laser beams 304 and 306 intersect at approximately the interrogation volume 310 to provide an improved illumination of scanning region 401 for substantially improved imaging by the line camera 202.

A common problem with sources of electromagnetic radiation, such as lasers 202 and 204, is the asymmetric distribution of the light source intensity. This asymmetry may vary over time or may be dependent upon the surface finish of the object. This induces unpredictable errors in the resulting surface contour measurements. In certain embodiments of the present invention a single laser or other source of electromagnetic radiation may be used. In such embodiments, the system 100 may need to be recalibrated periodically to compensate for this drift in symmetry. However, in certain illustrative embodiments, two lasers 202 and 204 are provided in each optical assembly 112. The use of two or more lasers is preferred since the intensity of the combined illumination of the imaged area 401 is substantially symmetrical regardless of any drift that may have occurred to the individual laser beams 304 and 310. As one skilled in the relevant are would find apparent, additional laser beams may be used to achieve even greater symmetry of the combined illuminating beam at the scanned area 401. It should be understood that the scanned area on the surface 350 is duplicated on the opposing surface of the blade 201 when an additional optical assembly 112 is used to measure the opposing surface. The resulting scanned information may then be used to subsequently determine the dimension of the blade 201.

As shown by the FIGS. 4E–4H, when the surface 350 is not parallel to the line array 301, the laser beams intersect each other at an angle, reducing the size of the instantaneous scanning region 401. The scanning region 401 travels in a vertical path substantially parallel with the Z-axis as the distance between the lasers 204 and 206 and the blade 201 decreases. In other words, the scanning region 401 produced by the intersection of the two laser beams 304 and 306 on the surface 350 of the blade 201 and reflected from the measured surface 350, travels in along the Z-axis within the imaged scanning region 401. The path followed by the scanning region 401 on the opposing sides of the blade 201 defines the interrogation volume 310.

As noted, the line cameras 202 are aligned with the imaged scanning region 401. In one embodiment, to maintain focus of the line cameras 202 throughout the scanning process, the camera 202 and the lasers 204 and 206; that is, the optical sensor assembly 112, are moved as a single unit relative to the blade 201.

Each portion of the imaged scanning region 401 reflects the radiation onto a particular location on the line array 301. The location of the reflected beam on the line array 301 can be determined by measuring currents induced photoelectrically in the photoelectric elements of the line array 301, as is known in the art. This location is related through known relationships to the displacement of the laser beams 304 and 306 on the blade surface. Displacements in the surface of the blade 201 towards or away from the line camera 202 cause the reflected laser beam 302 to have a different intensity distribution that is related to the amount of displacement of the surface. As noted, the projection and viewing angles are arbitrary, and can be chosen to maximize the resolution of the system within operational constraints.

In one preferred embodiment, the frame grabber 110 isolates and operates only on pixels which are illuminated above a certain threshold level. Only these pixels are processed and stored in a memory mapped buffer (not shown) by the frame grabber 110. In one embodiment, the buffer can store up to 8 frames of 8 bit per pixel data, and there are two 32 Kbyte buffers. In this embodiment, the line array 301 has 6000 elements with a 10×10 micron pixel size. Typically the system 100 operates at 2000 frames per second which corresponds approximately to a 20 micron interval when the blade 201 moves 40 mm/second. The controller 118 accumulates the intensity information from successive scans and calculates the center of the light distribution which represents the coordinate information along the Z axis.

In an alternative embodiment, the line camera sensor receiving aperture can be made arbitrarily narrow in order to allow the camera to view only a narrow beam in the XY plane. This automatically rejects the parasitic reflections which are often a common problem with the more conventional triangulation techniques employing position sensitive detectors.

Figure 5:
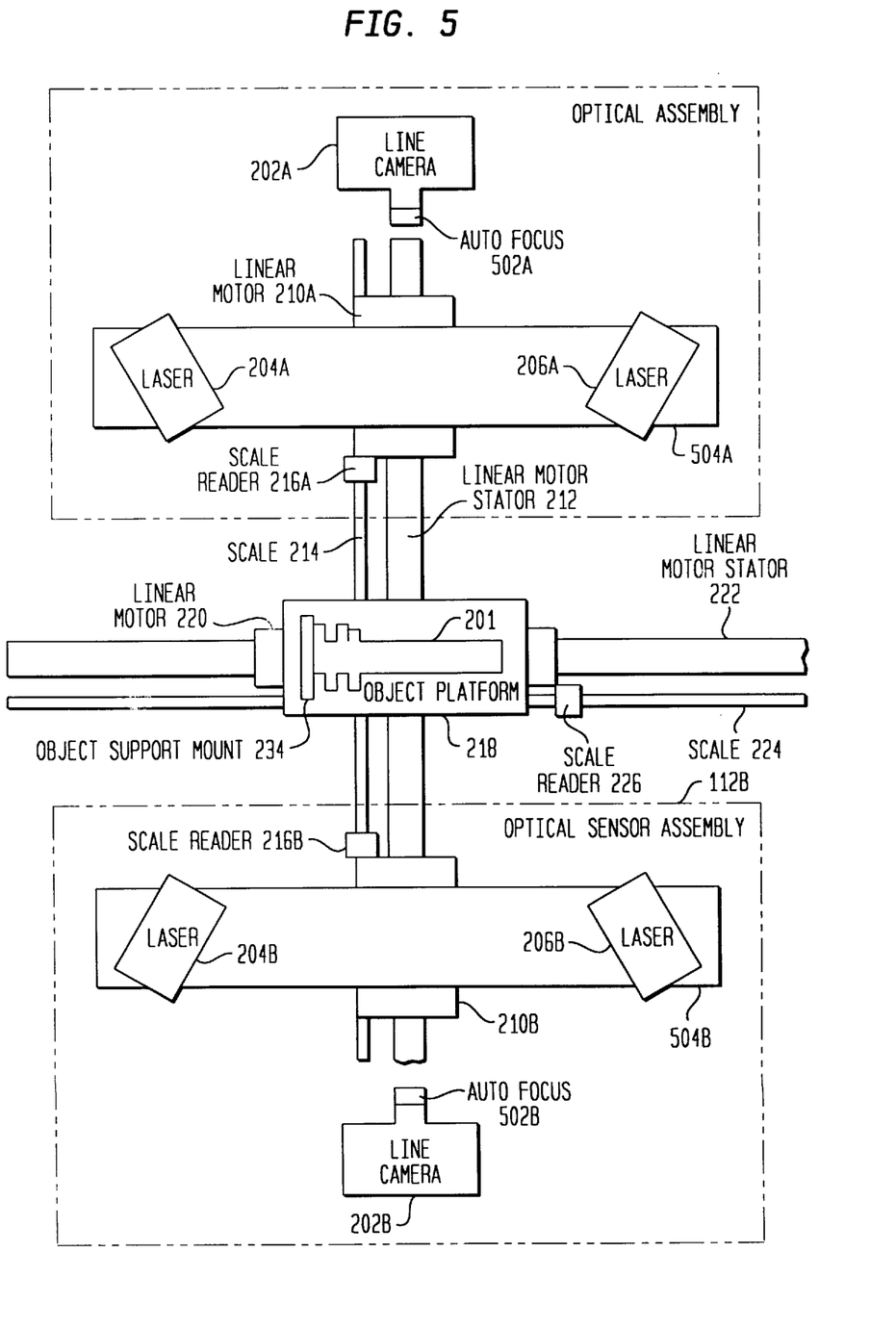
FIG. 5 is an architectural block diagram of an alternative embodiment of the present invention in which the lasers are fixed relative to each other while the line scan camera is stationary and automatically focused in accordance with the position of the lasers.

FIG. 5 is an architectural block diagram of an alternative embodiment of the present invention. In this embodiment the lasers 204 and 206 are fixed relative to each other and are dynamically positioned relative to the blade 201 while the line camera 202 is maintained in a stationary position on the optical bench 122.

Specifically, the lasers 204 and 206 are fixedly secured to a common platform 504 which positions the lasers 204 and 206 relative to the blade 201 to cause the laser beams 304, 306 to scan the surface 350 of the blade 201. As with the above embodiments, a scale reader or other device is provided to identify the position of the lasers 204, 206. In this embodiment, the line cameras 202 are configured with a automatic focus mechanism 502 that adjusts the focus of the line cameras 202 based upon the position of the lasers 204, 206 relative to the blade 201, as determined by the scale reader 216.

Alternatively, the blade object platform 218 may be positioned along the X axis. In this embodiment, the relative position of the lasers 204, 206 and blade 201 is determined by monitoring the position of the object platform 218 along the stator 212. This information is then directly or indirectly provided to the focus mechanism 502 on the line camera 202 to automatically adjust the focus of the associated line camera. It should be noted that the embodiment described above with reference to FIG. 2 is a preferred embodiment in that it eliminates the errors that may be introduced into the scale measurement and focusing operations and mechanisms.

Figure 6:
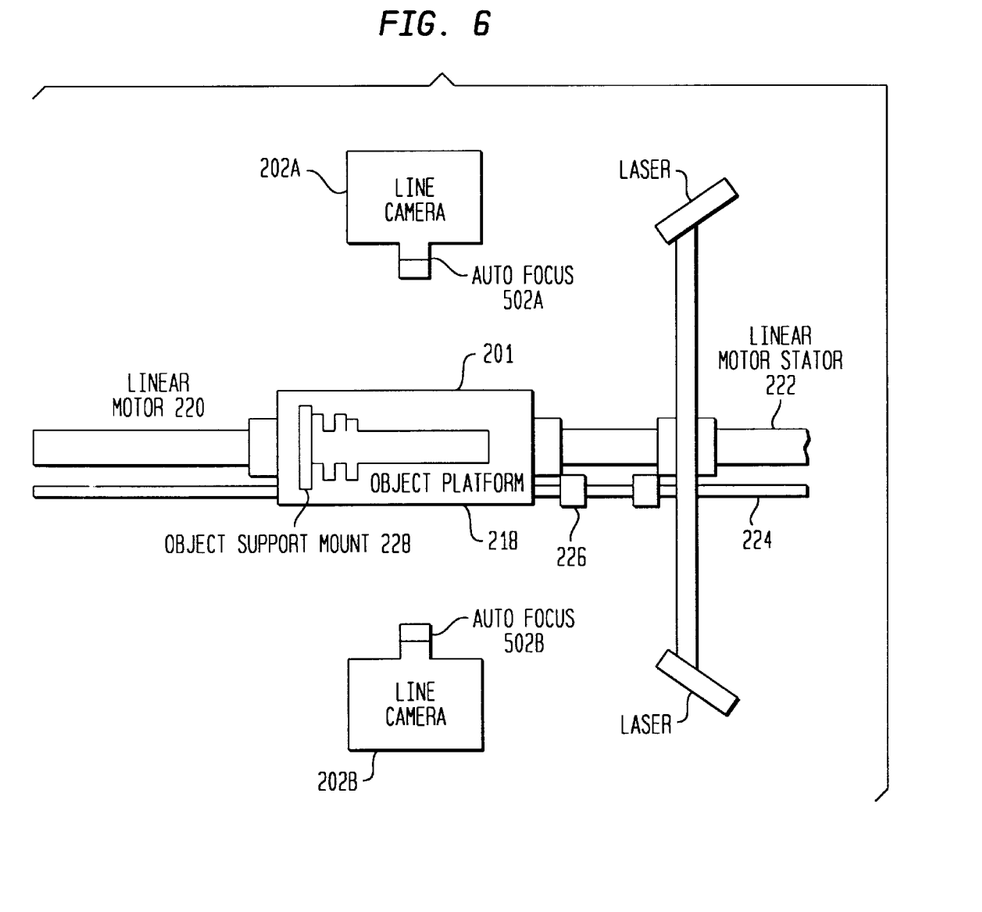
FIG. 6 is an architectural block diagram of another alternative embodiment of the present invention in which a single laser illuminates each opposing surface of the blade, and which are secured relative to each other, while the line scan cameras are stationary and automatically focused in accordance with the position of the lasers.

FIG. 6 is an architectural block diagram of another alternative embodiment of the present invention in which a single laser illuminates each opposing surface of the blade, and which are secured relative to each other, while the line scan cameras are stationary and automatically focused in accordance with the position of the lasers. Here, the lasers are secured to a common support structure and are moved together to illuminate a predetermined section on the blade 201.

Figure 7:
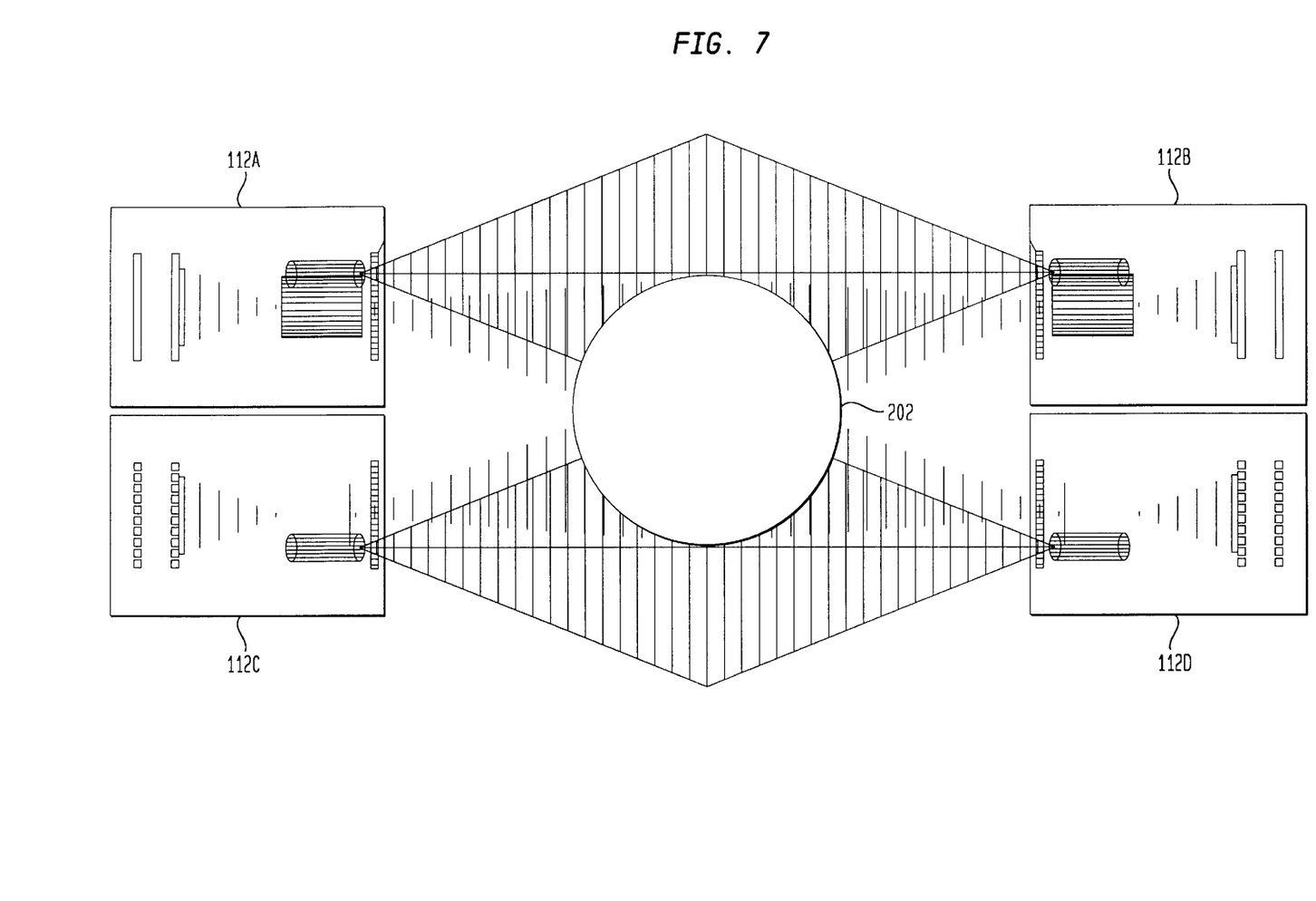
FIG. 7 is a side view of an alternative embodiment of the optical metrology system wherein multiple optical assemblies are implemented to measure the surface contour on each side of an object.

FIG. 7 is one preferred embodiment of the present invention wherein multiple optical assemblies 112 are utilized to measure the surface contour on each side of an object. In one or more of the prior illustrated embodiments, the system 100 may measure less than 180° around each side of the object such as blade 201 (FIG. 2), depending upon the size of the blade relative to the laser beams 304 and 306. Depending upon the surface configurations and orientation of the object, the remaining portion of the surface contour may interpolated analytically by the controller 118 to obtain a complete measurement of the cross-section being measured. In the embodiment illustrated in FIG. 7, the optical metrology system of the present invention includes additional optical sensor assemblies 112 to measure the complete surface contour. This enables the complete measurement of, for example, the leading and trailing edges of the blade 201. As shown in FIG. 7, an additional pair of optical sensor assemblies 112C and 112B are arranged on opposing sides of an object 702 in addition to the two optical assemblies 112A and 112B described above. By extending the laser beams beyond the upper and lower edges of the object 702, the complete cross-section of the object 702 may be measured in one scanning interval. The combined coordinate data collected from the four optical assemblies 112 provide the controller 118 with complete information of the cross-section. This is particularly useful when measuring blades such as blade 201 wherein the leading and trailing edges have small radii.

In an alternative embodiment an extra mechanical axis to move the blade in the vertical direction (along the Z axis) is used to obtain complete coordinate data of the cross section. To measure the leading and trailing edge, the blade is moved along the Z axis until one edge is close to the camera axis to allow the laser light and the camera line of sight to overlap that edge. The optical alignment of this configuration is simpler than the above configurations; however additional scans may be needed to obtain the complete coordinate data of the blade's cross-section.

While various embodiments of the present invention have been described above, it should be understood that they have been presented by way of example only, and not limitation. For example, the optical metrology system 100 of the present invention may include additional optical sensor assemblies to measure other sections of the blade 201. For example, an additional pair of optical sensor assemblies may be arranged on opposing sides, such as the top and bottom, of the blade 201 in addition to the optical sensor assemblies 112 described above. Furthermore, other configurations of the system 100 may include additional rotary axes to measure portions of the blade 201 that are not otherwise imaged by the line cameras 202 configured as shown in FIG. 2. In one embodiment, for instance, an additional rotary axis may be provided to measure the blade's root. In addition, different types of line cameras may be used, additional line cameras and/or lasers may also be employed, and other signal processing techniques may be implemented, depending upon the application. It should also be understood that the optical metrology system may include other components which are well known in the art. For example, the system 100 may include a feedback mechanism, connected between the output of the line cameras 202 and the lasers 204 and 206, for modulating the power of the lasers 204 and 206 in accordance with the intensity of the signal generated by the line cameras 202. In this embodiment, the system 100 automatically maintains the power output of the lasers 204 and 206 so as to keep the output of amplifiers connected to the line cameras 202 in the most linear region, as well as to maintain a high signal-to-noise ratio. Thus, the breadth and the scope of the present invention are not limited by any of the above exemplary embodiments, but are defined only in accordance with the following claims and their equivalents.

What is claimed is:

1. An optical metrology system for measuring a contour of a surface of an object, the system comprising:

an optical assembly arranged proximate to the object surface, including, first and second radiation sources each configured to project a substantially linear beam of imagable electromagnetic radiation on a predetermined portion of the proximate object surface, wherein said first and second radiation beams intersect to simultaneously illuminate a scanning region of said predetermined portion of the object surface, and a camera fixed relative to said first and second radiation sources and having a linear arrangement of detector elements substantially aligned with said predetermined portion of the proximate object surface so as to receive said imagable electromagnetic radiation reflected from said scanning region; and an adjustment apparatus constructed and arranged to adjust a relative position of the object and said optical assembly in a direction substantially parallel with a first axis to cause said linear beams projected by said first and second radiation sources to intersect to cause said scanning region to illuminate said predetermined portion of said proximate object surface during a scan.

2. The system of claim 1, wherein said camera is a CCD camera.

3. The system of claim 1, wherein said camera is a CID camera.

4. The system of claim 1, wherein said camera is a CMOS camera.

5. The system of claim 1, wherein the object is a jet engine blade.

6. The system of claim 1, further comprising:

a processor, operably coupled to said optical assembly, configured to determine the contour of the proximate object surface using said reflected electromagnetic radiation received by said camera.

7. The system of claim 1, further comprising:

an object control and support apparatus constructed and arranged to reposition the object to predetermined locations along a second axis substantially orthogonal to the first axis of the object.

8. The system of claim 1, wherein said first and second radiation sources are lasers.

9. The system of claim 1, wherein said electromagnetic radiation has a wavelength in the visible spectrum.

10. The system of claim 1, wherein said line camera comprises a single column of detector elements.

11. The system of claim 1, wherein said line camera comprises between one and three columns of detector elements.

12. An optical metrology system for measuring object surface contours, the system comprising:

a plurality of optical assemblies arranged proximate to opposing surfaces of the object surface, each including,
at least one radiation source configured to project a substantially linear beam of imagable electromagnetic radiation on a substantially linear portion of an opposing surface of the object, and
a camera having a column of detector elements substantially parallel with and proximate to the opposing surface and configured to receive the electromagnetic radiation reflected from the proximate object surface, wherein the portion of the object surface is substantially aligned with said column of detector elements;
first adjustment apparatus constructed and arranged to adjust a distance between said at least one radiation source and the proximate object surface, said adjustment occurring along a first axis of the object; and
second adjustment apparatus constructed and arranged to adjust a relative position of the object and said plurality of optical assemblies in a direction substantially parallel with said first axis of the object.

13. The system of claim 12, wherein said camera is a CCD camera.

14. The system of claim 12, wherein the object is a jet engine blade.

15. The system of claim 12, further comprising:

a processor, operably coupled to said plurality of optical assemblies, configured to determine the contours of each of the proximate object surfaces using the reflected electromagnetic radiation received by said camera.

16. The system of claim 12, wherein said first adjustment apparatus is constructed and arranged to secure the object and to reposition the object to predetermined locations along said first axis of the object.

17. The system of claim 12, wherein said at least one radiation source is a laser.

18. The system of claim 12, wherein said electromagnetic radiation has a wavelength in the visible spectrum.

19. The system of claim 12, wherein said plurality of optical assemblies comprise:

first and second optical assemblies arranged proximate to one of said opposing surfaces of the object such that first and second linear beams generated by said first optical assembly are substantially contiguous with said first and second linear beams generated by said second optical assembly to illuminate said portion of said surface that is substantially aligned with said column of detector elements, wherein said contiguous laser beams extend beyond upper and lower edges of the object; and third and fourth optical assemblies arranged proximate to the other of said opposing surfaces of the object such that first and second linear beams generated by said third optical assembly are substantially contiguous with said first and second linear beams generated by said fourth optical assembly to illuminate said portion of said surface that is substantially aligned with said column of detector elements, wherein said contiguous laser beams extend beyond upper and lower edges of the object.

20. An optical metrology system for measuring cross-sections of an object substantially orthogonal to an axis of the object, the system comprising:

an optical assembly arranged proximate to a surface of a predetermined section of the object, including,
a first and a second light source, each configured to project a substantially parallel linear beam on the proximate object surface, and
a line scan camera having a column of detector elements substantially parallel with the proximate object surface configured to receive light reflected from the proximate object surface;
first object adjustment device constructed and arranged to adjust a distance between said first and second light sources and the object to cause said first and second beams to intersect each other at a scanning region that traverses the object surface substantially aligned with said column of detector elements; and
second object adjustment device constructed and arranged to rotate the object to place an opposing side of the object at said predetermined section in alignment with said column of detector elements.

21. The system of claim 20, further comprising:

third object adjustment device constructed and arranged to adjust a relative position of the object and said optical assemblies along said axis of said object.

22. The system of claim 20, wherein said first and second light sources are lasers.

23. An apparatus for non-contact inspection of an object, the object having physical dimensions including a longitudinal axis, comprising:

first and second optical assemblies arranged in substantial alignment with each other and on opposing sides of the object, each said optical assembly including one or more projectors for generating a substantially linear projection of electromagnetic radiation on the object to define an interrogation volume at a predetermined of the object and a line scan camera having a column of detector elements substantially parallel with a surface of the object at the predetermined object section, said line scan camera configured to receive light reflected from the proximate object surface; and adjustment apparatus for adjusting the object in a direction substantially orthogonal to the longitudinal axis of the object to change a distance between said first and second optical assemblies and the object.

24. The apparatus of claim 23, further comprising:

drive means for adjusting a relative position of the object and said optical assemblies along said longitudinal axis to position a desired section of the object in said interrogation volume, said one or more projectors of each said optical assembly projecting said electromagnetic radiation on an opposing surface of the desired section of the object, wherein said optical assemblies include a line scan camera for receiving reflected radiation from said opposing surface of the object.

* * * * *